Oct. 10, 1961 A. J. BÜCHI 3,003,483
INTERNAL COMBUSTION PISTON ENGINE
Filed July 5, 1960 2 Sheets-Sheet 1

Inventor
A. J. Büchi
By Glascon Downing Seebold
Attys.

United States Patent Office 3,003,483
Patented Oct. 10, 1961

3,003,483
INTERNAL COMBUSTION PISTON ENGINE
Alfred Johann Büchi, Archstrasse 2,
Winterthur, Switzerland
Filed July 5, 1960, Ser. No. 40,939
Claims priority, application Switzerland July 8, 1959
8 Claims. (Cl. 123—32)

The invention relates to a supercharged and scavenged internal combustion piston engine.

According to the invention there is provided an internal combustion piston engine having inlet and outlet valves guided coaxially one within the other, and a combustion space of the form of a body of revolution, the combustion space being formed almost wholly by a cup-like cavity in the piston crown, the piston then being in the upper dead centre position, the axis of said body of revolution being in line with the axis of the valves, and the piston crown having an annular surface surrounding said cavity and centred on said axis and mating with a thereto parallel annular face on the cylinder head and surrounding the outer valve, the combustion space being so dimensioned that with a given compression ratio and a predetermined opening position of the valves during the scavenging period in which the valves extend into the cup-like cavity, the surface of the combustion space is at least approximately a minimum in relation to its volumetric size.

In one form, according to the invention said annular surface may be flat and disposed perpendicular to the axis of the valves.

In another form according to the invention said annular surface may be a frusto-conical surface disposed above the level of the bottom of said cup-like cavity, in which case said parallel annular face on the cylinder head is a frusto-conical face, the frusto-conical surface and the frusto-conical face being disposed such that their projected cone points lie in the cylinder head.

According to a feature of the present invention the surface of the combustion space is at the most, not more than about 5 percent greater than the surface of a semi-spherical combustion space of the same volume.

According to a further feature of the present invention, the faces of the valve plates, in the closed position of the valves, be at least approximately in the plane of the mouth of the cup-like cavity in the piston crown.

A still further feature of the invention is to be seen in that during the scavenging period the through-flow area from the inlet to the outlet for the scavenging air is the smallest between the outer valve plate and the wall of the cup-like cavity in the piston crown.

Figure 1:
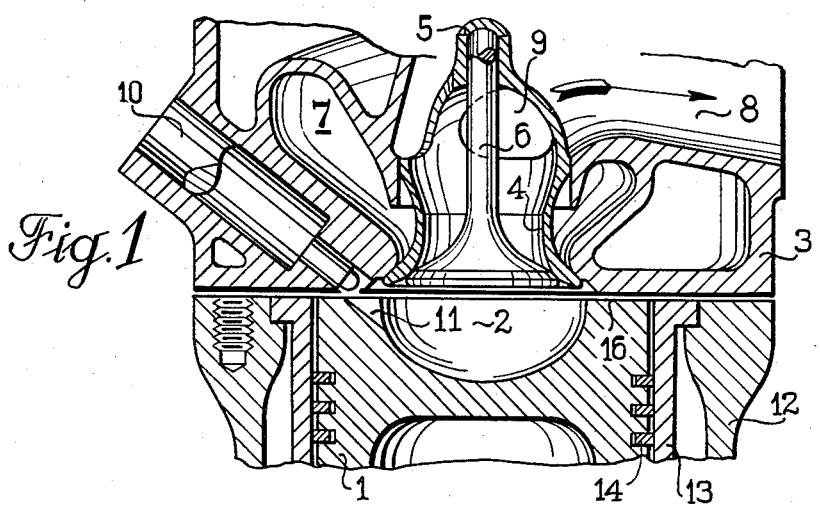
Figure 1A:
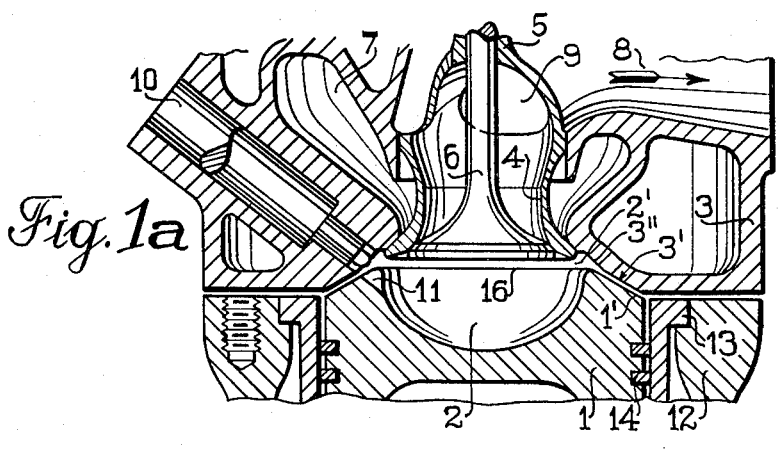
Figure 2:
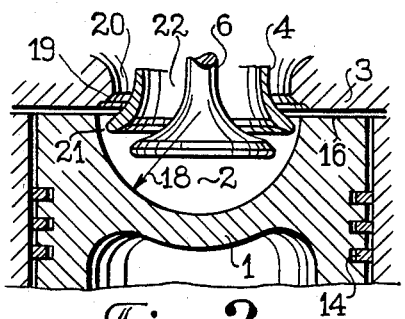
Figure 4:
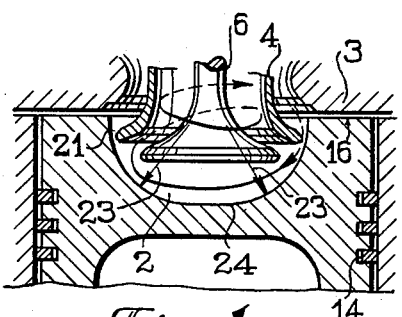
Figure 3:
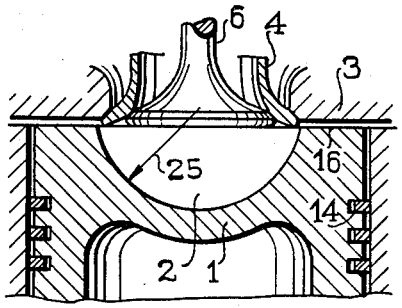

Embodiments illustrating the invention by way of example only, will now be described with reference to the appended drawings in which:

FIG. 1 is a sectional elevation showing the relevant parts of an internal combustion piston engine according to the invention; the piston crown and the cylinder head having flat annular mating parts, FIG. 1a is a similar elevation of a further internal combustion piston engine with the piston crown and the cylinder head being formed with frusto-conical mating parts, and FIGS. 2 to 4 are sectional elevations each showing a different form which may be adopted for the cup-like cavity in the piston crown of the engine shown in FIG. 1.

In FIG. 1 and FIG. 1a the cup-like cavity 2 is of elliptical profile, in FIG. 2 it is of semi-circular profile, in FIG. 3 the cup-like cavity is of a circular profile of less than 180° and in FIG. 4 the profile of the cup-like cavity is made up of two circular segments of about 90° joined by a straight line, the centres of curvatures of the circular segments being spaced apart and lying within the piston crown.

In the FIGS. 1, 1a to 4 the reference 1 represents the piston, 2 is the cup-like cavity constituting, almost wholly, the combustion space. The reference 3 indicates the cylinder head and 4 the outer valve which is guided therein. The reference 6 is the inner valve guided in the hollow shaft 5 of the outer valve. The supply chamber for the air charge is indicated at 7 (see FIGS. 1 and 2); the chamber 7 is spirally formed in relation to the valve seat of the valve 4, discharging the air tangentially into the cylinder. The exhaust duct 8 is adjoining the through-flow openings 9 in the outer valve. A fuel injector is fitted in the bore 10. There is a slot 11 through the rim portion 16 of the combustion space for the fuel jets. The cylinder block and the therein mounted cylinder liner are indicated at 12 and 13, respectively. The piston rings are indicated at 14.

In FIG. 1 the piston crown is formed with an annular flat surface 16 surrounding the cup-like cavity 2. This is different in FIG. 1a, where the piston crown is formed with a frusto-conical surface 1' surrounding the combustion space 2. The surface 1' is parallel to a frusto-conical face 3' on the cylinder head. The profile of the face 3" is of a smaller cone angle than the face 3'. The cup-like cavity 2 in both FIG. 1 and 1a is of the form of an ellipsoid having its main plane disposed in the plane 16 of the mouth of the cup-like cavity 2.

In FIG. 2, the cup-like cavity 2 in the piston crown is semi-spherical. The radius 18 of this cavity is so chosen that its surface is a minimum with the given compression ratio and volumetric size. The radius 18 has its centre located approximately at the point of intersection of the plane 16 with the cylinder axis. The outer valve 4 and the inner valve 6 are shown in the open position. It will be seen that both valves in this position project into the cup-like cavity 2. The outer valve 4 forms in the cavity a narrow cross-sectional passage 21 through which for example the scavenging air enters the space 22 between the outer valve 4 and the inner valve 6. During the scavenging period the through-flow passage from the inlet to the outlet for the scavenging air is smallest between the outer valve plate and the wall of the combustion space.

In FIG. 3, the cup-like cavity 2 is part spherical, its radius 25 being centred on the cylinder axis at a point above the plane 16. The diameter of the cavity 2 in the plane 16 is so chosen that this produces the smallest surface with respect to the volumetric size thereof in the scavenging dead centre position of the piston. The valves 4 and 6 are shown in the closed position. The surface of the combustion space is defined by the surface of the cup-like cavity and by the face of the valve plates 4 and 6.

It is possible to arrange that only the face of one valve plate is disposed at the height of the plane 16. In this case, the surface of the combustion space is increased by an additional surface to that in the cup-like cavity 2. The increase of said minimum surface of the combustion space should however not be more than about 5% of the surface of a semi-spherical combustion space of the same volumetric size.

According to FIG. 4, the cup-like cavity is defined by curvatures 23 of approximately 90°, the centres of which lie below the plane 16, and by a horizontally disposed flat bottom part 24. In the upper dead centre position of the piston during scavenging the surface of the cavity 2 is at a minimum in comparison to its volumetric size, and for a given compression ratio.

The combustion space in each of the examples described is formed almost entirely by the cup-like cavity 2 in the piston crown, the piston then of course being in its upper dead centre position. The combusion space is shaped as a body of revolution about a vertical axis in line with that of the concentric valves 4 and 6. Thus the surface 16 or 1' surrounding the cup-like cavities are likewise centred on the axis of the valves.

The inner and outer peripheral dimensions of the surfaces 16 and 1' are preferably selected such that the largest diameter of the cup-like cavity, in the plane of the mouth of the cavity, is 55% to 65% of the piston diameter, the surfaces 16 and 1' extending between the outer periphery of the piston crown and the edge of the cup-like cavity as shown.

In order that the outer valve 4 may open into the cup-like cavity the diameter of the cavity in the plane of the mouth of the cavity should preferably not be less than 2% greater than the maximum diameter of the face plate of the outer valve, and it may be as much as 8% greater.

The actual dimensioning of the cavity in relation to the face plate of the outer valve depends on the shape of the cavity towards its mouth and the lining of the outer valve.

Preferably the largest opening stroke of the inner valve is reached approximately in the uppermost piston position during the scavenging period.

Preferably also flow cross-sections between the mating valve seats of both valves are approximately equal in the upper dead centre scavenging position.

A design according to the present invention offers the possibility of altering the volume of the combustion space by interchanging the piston with one in which the cup-like cavity in the crown is in a different axial position, i.e. the cup-like cavity is displaced axially. In the same way the compression ratio may be altered.

What I claim is:
1. An internal combustion engine including a cylinder head, a cylinder, a piston in the cylinder, inlet and outlet valves supported in the cylinder head and guided coaxially one within the other, a crown for the piston facing the cylinder head provided with a cavity in the form of a body of revolution, the axis of which is in line with the axis of said valves, said piston crown having an annular surface surrounding the cavity, said cylinder head having an annular surface surrounding said valves and lying substantially parallel to the annular surface of the piston crown, said cavity defining approximately entirely a substantially semi-spherical combustion space when the piston is in the upper dead center position, the surface of said cavity differing by at most five percent from the surface of a hypothetical semi-spherical cavity of equal volume, and said cavity in the upper dead center position of the piston being capable of receiving the fully open inner valve and the at least partially open outer valve.

2. An internal combustion engine according to claim 1, wherein said annular surfaces are flat and disposed perpendicular to the axis of the valves.

3. An internal combustion engine according to claim 1, wherein said outer valve is provided with a face plate and the greatest diameter of the cavity, in the plane of the mouth of the cavity, is about 2 to 8 percent larger than the largest diameter of the face plate of the outer valve.

4. An internal combustion engine according to claim 1, wherein the largest diameter of the cavity is 55 to 65 percent of the piston diameter.

5. An internal combustion engine according to claim 1, including valve seats for said valves and wherein the flow cross-sections between the mating valve seats of said valves are approximately equal in the upper dead center scavenging position.

6. An internal combustion engine according to claim 1, wherein each of said valves is provided with a face plate and the faces of the valve plates in their closed position lying at least approximately in the plane of the mouth of the cavity in the piston crown.

7. An internal combustion engine according to claim 1, wherein each of said valves is provided with a face plate and at least one of the valve plates being so arranged relative to the cylinder head that a fraction of the combustion space is disposed in the cylinder head.

8. An internal combustion engine according to claim 1, wherein with said valves being open and the cylinder being scavenged, the through flow area from the inlet to the outlet for the scavenging air is smallest between the outer valve and the surface of the cavity in the piston crown.

References Cited in the file of this patent
UNITED STATES PATENTS

| | | |
|---|---|---|
| 1,828,792 | Tverbakk | Oct. 27, 1931 |
| 2,045,122 | Cases | June 23, 1936 |
| 2,213,202 | Buchi | Sept. 3, 1940 |
| 2,840,059 | Buchi | June 24, 1958 |